(12) United States Patent
Xu et al.

(10) Patent No.: US 11,379,878 B2
(45) Date of Patent: Jul. 5, 2022

(54) WHEEL ROTATION IMAGING DEVICE AND WHEEL ROTATION IMAGING INTELLIGENT ADVERTISING SYSTEM

(71) Applicant: CITIC Dicastal CO., LTD., Hebei (CN)

(72) Inventors: Shiwen Xu, Qinhuangdao (CN); Minglei Li, Qinhuangdao (CN); Yao Dai, Qinhuangdao (CN); Weidong Liu, Qinhuangdao (CN); Xi Li, Qinhuangdao (CN); Shaoqian Wang, Qinhuangdao (CN); Liangjian Yue, Qinhuangdao (CN); Dadong Wang, Qinhuangdao (CN); Hongwei Sheng, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 308 days.

(21) Appl. No.: 16/811,127

(22) Filed: Mar. 6, 2020

(65) Prior Publication Data
US 2021/0035160 A1 Feb. 4, 2021

(30) Foreign Application Priority Data
Jul. 30, 2019 (CN) .......................... 201910693245.X (51) Int. Cl.
| | | |
|---|---|---|
| *G06Q 30/02* | (2012.01) | |
| *B60Q 1/32* | (2006.01) | |
| *G09F 21/04* | (2006.01) | |
| *G09F 19/02* | (2006.01) | |
| *H02K 7/18* | (2006.01) | |
| *H02K 7/06* | (2006.01) | |
| *G09F 19/12* | (2006.01) | |
| *G09F 27/00* | (2006.01) | |

(Continued)

(52) U.S. Cl.
CPC ......... *G06Q 30/0265* (2013.01); *B60Q 1/326* (2013.01); *G06Q 30/0273* (2013.01); *G09F 9/33* (2013.01); *G09F 19/02* (2013.01); *G09F 19/12* (2013.01); *G09F 21/045* (2013.01); *G09F 27/005* (2013.01); *G09G 3/005* (2013.01); *G09G 3/32* (2013.01); *H02K 7/063* (2013.01); *H02K 7/1846* (2013.01); *B60Q 2900/30* (2013.01)

(58) Field of Classification Search
None
See application file for complete search history.

(56) References Cited

U.S. PATENT DOCUMENTS 10,109,224 B1 * 10/2018 Ratti ...................... G09G 3/005

FOREIGN PATENT DOCUMENTS

| CN | 201012651 Y | 1/2003 |
|---|---|---|
| CN | 1797461 A | 7/2006 |

(Continued)

*Primary Examiner* — Ashok Patel
(74) *Attorney, Agent, or Firm* — Cooper Legal Group, LLC (57) ABSTRACT

The present application provides a wheel rotation imaging device and a wheel rotation imaging intelligent advertising system. In the wheel rotation imaging device, power can be supplied by means of rotation of a wheel with the use of a self-powered unit, so an external power supply is not required; texts, images and videos can be displayed; in addition, a variety of sensors are integrated to acquire operation information of the device in real time, which facilitates the wheel rotation imaging device to adjust the imaging angle and brightness.

12 Claims, 6 Drawing Sheets

(51) Int. Cl.
*G09F 9/33* (2006.01)
*G09G 3/32* (2016.01)
*G09G 3/00* (2006.01)

(56) References Cited

FOREIGN PATENT DOCUMENTS

| | | | |
|---|---|---|---|
| CN | 101169911 A | 4/2008 |
| CN | 102035841 A | 4/2011 |
| CN | 203248308 U | 10/2013 |
| CN | 205423051 U | 8/2016 |
| CN | 107284568 A | 10/2017 |
| CN | 107369397 A | 11/2017 |
| CN | 107507544 A | 12/2017 |
| CN | 207250095 U | 4/2018 |
| CN | 108074495 A | 5/2018 |
| CN | 108962108 A | 12/2018 |
| CN | 109067097 A | 12/2018 |
| CN | 208475212 U | 2/2019 |
| KR | 20170100127 A | 9/2017 |

\* cited by examiner

WHEEL ROTATION IMAGING DEVICE AND WHEEL ROTATION IMAGING INTELLIGENT ADVERTISING SYSTEM

CROSS-REFERENCE TO RELATED APPLICATIONS

The present application claims benefit of Chinese Patent Application No. 201910693245.X, filed on Jul. 30, 2019, the contents of which are hereby incorporated by reference in their entirety.

BACKGROUND

With the growth of China's car sales in recent years, the domestic car ownership has exceeded 300 million. For advertisers, car wheels have become a good advertising medium. In today's rapid development of information technology, car wheel display devices and wheel advertising products have become research hotspots. At present, the wheel display devices and the advertising products mostly rely on internal rechargeable battery packs to supply power, require external charging, and therefore are relatively complicated in structure and inconvenient to install. In addition, the display content is simple, and the replacement of display content is complicated; the motion state parameter and external environment information of the wheel display devices cannot be acquired in real time, the display is unstable, the effect is fuzzy, the user experience cannot be satisfied and the advertising effect cannot be achieved.

SUMMARY

The present application relates to the technical field of display devices, and specifically to a wheel rotation imaging device and a wheel rotation imaging intelligent advertising system.

Embodiments of the present application provide a wheel rotation imaging device and a wheel rotation imaging intelligent advertising system, which can solve the technical problems in the background art. Power can be supplied by means of rotation of a wheel with the use of a self-powered unit, so an external power supply is not required; texts, images and videos can be displayed, the display effect is more glaring, and the replacement of display is simple; in addition, a variety of sensors are integrated to acquire information in real time such as wheel speed, wheel angular velocity, wheel acceleration, light intensity, and location information, which facilitates the wheel rotation imaging device to adjust the imaging angle and brightness, thereby ensuring stable and clear imaging, achieving advertising effects, and allowing a user to have a more wonderful experience.

In order to achieve the above objectives, the present disclosure provides the following technical solution:

In a first aspect, provided is a wheel rotation imaging device, including a self-powered unit, a power storage module, a core control circuit board, and an LED strip board, in which the LED strip board matches the shape of a wheel, and includes a plurality of LED bead arrays extending radially outward along the wheel, an interface, and a control circuit, the interface and the control circuit being connected to LED beads in each LED bead array by signals, and each LED bead array containing the same number of beads; the self-powered unit generates power by means of rotation of the wheel; the core control circuit board includes a charging module, a power management module, and a core control module; the charging module includes a rectifier circuit and a charging management circuit; the self-powered unit is electrically connected to the charging module, the charging module is electrically connected to the power storage module, and the charging module rectifies alternating current input by the self-powered unit, and charges the power storage module through the charging management circuit; the power storage module is connected to the power management module and supplies power to the power management module, and the power management module supplies power to the core control module, the interface and the control circuit; the core control module is connected to the interface and the control circuit by signals, and the core control module integrates wireless modules, a positioning module, rotational speed sensors, a micro-electromechanical system (MEMS sensor) with built-in three-axis gyroscope and three-axis accelerometer, a light intensity sensor, and storage elements; the core control module can receive content information to be displayed through the wireless modules, and convert the content information to be displayed into driving signals for driving the LED beads on the LED strip board to light or extinguish in a time sequence, the core control module transmits the driving signals to the interface and the control circuit, and the interface and the control circuit drive the LED beads on the LED strip board to display the content to be displayed; and the core control module can acquire location information, wheel speed information, wheel angular velocity information, wheel acceleration information, and light intensity information of the wheel rotation imaging device in real time. According to the wheel rotation imaging device in this embodiment, power can be supplied by means of rotation of a wheel with the use of a self-powered unit, so an external power supply is not required; texts, images and videos can be displayed, the display effect is more glaring, and the replacement of display is simple; with the design of a power storage module and a charging management module, the power supply of a core control module is more stable, and the safety of the device is ensured; in addition, a variety of sensors are integrated to acquire information in real time such as wheel speed, wheel angular velocity, wheel acceleration, and light intensity, which facilitates the wheel rotation imaging device to adjust the imaging angle and brightness, thereby ensuring stable and clear imaging, achieving advertising effects, and allowing a user to have a more wonderful experience.

In some embodiments, in which the core control module includes a state parameter detecting module, a main control management module, and a display data processing module; the state parameter detecting module includes a first control module, a first rotational speed sensor, and a light intensity sensor, both the first rotational speed sensor and the light intensity sensor being connected to the first control module by signals; the main control management module includes a second control module, a 4G module with a positioning module, and a WiFi module, both the 4G module and the WiFi module being connected to the second control module by signals; the display data processing module includes a micro-electromechanical system with built-in three-axis gyroscope and three-axis accelerometer, a second rotational speed sensor, and a third control module, both the micro-electromechanical system and the second rotational speed sensor being connected to the third control module by signals; the first control module and the third control module are both connected to the second control module by signals. In this embodiment, the structure of the core control module is designed in detail, including a state parameter detecting module, a main control management module, and a display data processing module, for controlling different functions separately, thereby improving the controllability of the system and improving the fault tolerance of the system.

In some embodiments, in which the charging module further includes a battery temperature protection circuit for preventing excess temperature of batteries; an overvoltage and overcurrent protection circuit is further disposed between the power storage module and the power management module, and the power storage module is connected to the power management module through the overvoltage and overcurrent protection circuit. In this embodiment, the charging module protection circuit is provided to prevent risks caused by excess temperature of batteries, and the protection circuit at the same time of power supply is provided to prevent risks caused by damage or burning of the device due to instable voltage.

In some embodiments, in which the self-powered unit includes a shell, a bearing, a rotor, a stator, a bearing seat, and an eccentric weight; the rotor includes a core and a coil, the rotor is fixed to the bearing seat, the bearing seat is fixed to a housing of the wheel rotation imaging device, the housing of the wheel rotation imaging device is fixed to the wheel, and the rotor rotates synchronously with the wheel; the stator is disposed inside the shell and is annular, the bearing is fixed in the center of the inner side of the shell, and the eccentric weight is fixedly mounted to the outer side of the shell; the bearing passes through the centers of the bearing seat and the rotor, and the stator is sleeved on the periphery of the rotor; the rotation of the wheel drives the rotor to rotate, the eccentric weight, the shell and the stator are stationary, and the rotor and the stator move relative to each other to cut magnetic induction lines so as to generate current. In this embodiment, the specific structure and working principle of the self-powered unit are designed, where the structure is simple, the efficiency of generating power is high, the charging efficiency is high, the display requirement of the rotation imaging display device can be met, and the utility is strong.

In a second aspect, an embodiment of the present application provides a wheel rotation imaging intelligent advertising system, including an advertising control platform, a user terminal, in which the wheel rotation imaging intelligent advertising system further includes the wheel rotation imaging device according to any one of the above embodiments, the advertising control platform being able to establish a wireless connection with the wheel rotation imaging device and the user terminal and data being transmitted to each other; the user terminal being able to establish a wireless connection with the wheel rotation imaging device and data being transmitted to each other; the advertising control platform includes a storage module, and the storage module stores a user database; the user terminal can perform user registration and login on the advertising control platform, acquire a storage space to establish a corresponding user database, add the device number of more than one wheel rotation imaging device to the corresponding user database, and apply for an advertisement to the advertising control platform; the advertising control platform can establish a wireless connection with the corresponding wheel rotation imaging device according to the device number, and transmit advertising data to the corresponding wheel rotation imaging device through a wireless network; the wheel rotation imaging device is mounted to a wheel, the advertising content is displayed as the wheel rotates, and the wheel rotation imaging device can complete rotation imaging display of the advertising content according to the received advertising data. The wheel rotation imaging intelligent advertising system in this embodiment adopts the above wheel rotation imaging device, and the system can acquire state parameters and operation information of the rotation imaging device in real time, so on the one hand, the wheel rotation imaging device can adjust the imaging angle and brightness to ensure stable imaging, the advertising effect is good, and the user has a more wonderful experience, and on the other hand, convenience is provided for advertising operations of an advertising system, such as fee calculation, user management, and material management. In addition, with the design of the advertising control platform, the user terminal and the wheel rotation imaging device, the separated three parts constitute a system, which has strong practicability and facilitates user access. The user can change the user terminal and logs in with different user terminals to control the system, so that the feasibility of the advertising system is improved, meanwhile, advertisement sending and fee settlement of the advertising system are convenient, and the development of car wheel advertising media is effectively promoted.

In some embodiments, in which user's advertising materials are stored in the user database of the advertising control platform, the user terminal can establish a wireless connection with the advertising control platform, and the advertising materials can be increased by uploading or downloading on the advertising control platform, and can be packaged, edited and deleted. In this embodiment, the user terminal can manage advertising materials.

In some embodiments, in which the advertising control platform can set user levels, and different levels of users have different rights to upload, download, and delete the advertising materials. In this embodiment, user rights are set to improve the security of management and meet the requirements of user differentiation of the advertising system.

In some embodiments, in which the advertising control platform can acquire operation information of the wheel rotation imaging device, update the operation information, and synchronize the operation information to the corresponding user database, the operation information including rotation imaging display content and display duration information, stored advertising data information, device state information, location information, wheel speed information, or light intensity information. In this embodiment, the advertising control platform can acquire operation information and state parameters of the wheel rotation imaging device in real time, which facilitates advertisement-related management.

In some embodiments, in which the advertising control platform can perform fee calculation and billing update according to the operation information, and synchronize the fee information and the billing state to the user database; and the user terminal can remotely access the user database, view billing rule, billing state and fee information in real time, and recharge, collect or pay the fee. In this embodiment, the fee management and query of the advertising system are realized, which facilitates the use of the user and facilitates the promotion of the advertising system.

In some embodiments, in which the user terminal can remotely access the user database, consult user information, information of the wheel rotation imaging device and software version information, and view the operation information and operation history information of the wheel rotation imaging device in real time. In this embodiment, the user terminal and the query and management functions are added, so that the operability and control ability of the user are improved, and the needs of user terminal control are met.

Compared with the prior art, the present disclosure has the beneficial effects:

The present disclosure provides a wheel rotation imaging device, where power can be supplied by means of rotation of a wheel with the use of a self-powered unit, so an external power supply is not required; texts, images and videos can be displayed, the display effect is more glaring, and the replacement of display is simple; with the design of a power storage module and a charging management module, the power supply of a core control module is more stable, and the safety of the device is ensured; in addition, a variety of sensors are integrated to acquire information in real time such as wheel speed, wheel angular velocity, wheel acceleration, and light intensity, which facilitates the wheel rotation imaging device to adjust the imaging angle and brightness, thereby ensuring stable and clear imaging, achieving advertising effects, and allowing a user to have a more wonderful experience.

A wheel rotation imaging intelligent advertising system is provided based on the wheel rotation imaging device, where the system can acquire state parameters and operation information of the rotation imaging device in real time, so on the one hand, the wheel rotation imaging device can adjust the imaging angle and brightness to ensure stable imaging, the advertising effect is good, and the user has a more wonderful experience, and on the other hand, convenience is provided for advertising operations of an advertising system, such as fee calculation, user management, and material management. In addition, with the design of an advertising control platform, a user terminal and a wheel rotation imaging device, the separated three parts constitute a system, which has strong practicability and facilitates user access. The user can change the user terminal and logs in with different user terminals to control the system, so that the feasibility of the advertising system is improved, meanwhile, advertisement sending and fee settlement of the advertising system are convenient, and the development of car wheel advertising media is effectively promoted.

BRIEF DESCRIPTION OF DRAWINGS

In order to more clearly explain the technical solution in the embodiments of the application, drawings which require to be used in description of the embodiments are simply introduced below, obviously, the drawings in description below are some embodiments of the application, and those having ordinary skill in the art can further acquire other drawings without creative efforts according to those drawings.

In which: 1—upper shell, 2—LED strip board, 3—core control circuit board, 4—power storage module, 5—self-powered unit, 6—waterproof rubber pad, 7—lower shell, 8—shell, 9—bearing, 10—rotor, 11—high temperature magnetic pole, 12—bearing seat, 13—eccentric weight.

DETAILED DESCRIPTION

The technical solution in the embodiments of the application is clearly and completely described in combination with drawings of the embodiments of the application below, and obviously, the described embodiments are part of embodiments of the application rather than all embodiments. Based on the embodiments of the application, all the other embodiments obtained by those having ordinary skill in the art without any creative works are within the protection scope of the application.

The terms 'first', 'second', 'third', 'fourth' and the like in the specification and in the claims of the application are used for distinguishing different objects but not for describing a specific sequence. Furthermore, the terms 'include' and 'have' as well as their any variations are intended to cover a non-exclusive inclusion. For example, a process, method, system, product or equipment including a series of steps or units does not limit steps or units which have been listed, but selectively further includes steps or units which are not listed, or selectively further includes other inherent steps or units for the process, method, product or equipment.

Reference in the specification to 'embodiments' of the application means that a particular feature, structure or characteristic described in connection with the embodiments is included in at least one embodiment of the application. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the application can be combined to other embodiments.

In order to further understand the content, features and functions of the disclosure, the following embodiments are given and illustrated with the attached drawings as follows.

Embodiment 1

Figure 1:
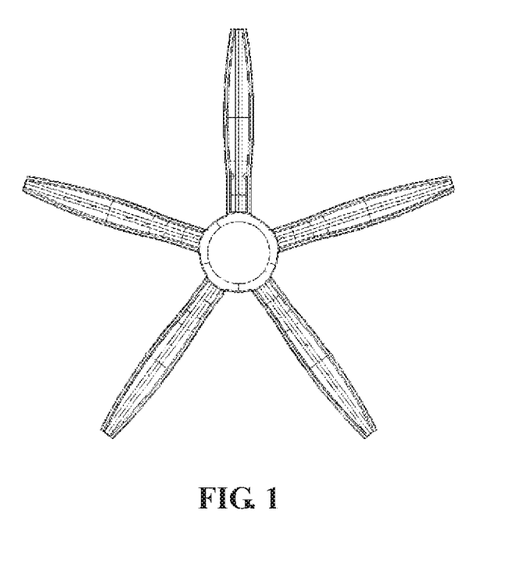
FIG. 1 is a top view of a wheel rotation imaging device according to the present disclosure.
Figure 2:
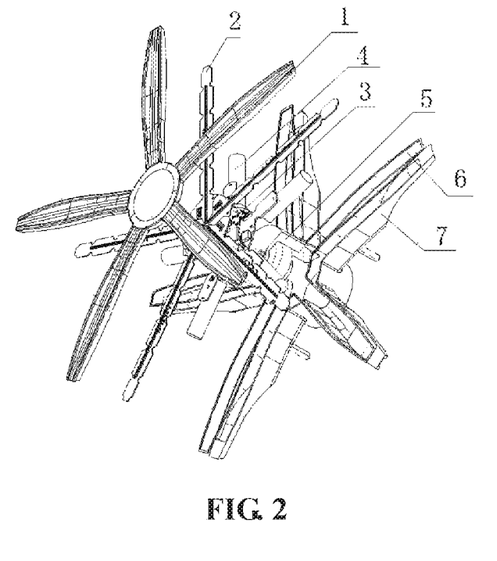
FIG. 2 is a schematic diagram of an assembly structure of the wheel rotation imaging device according to the present disclosure.

The first embodiment of the present application will be described below with reference to FIGS. 1-5. As shown in FIGS. 1-2, a wheel rotation imaging device includes an upper shell 1, a lower shell 7, a self-powered unit 5, a power storage module 4, a core control circuit board 3, an LED strip board 2, and a waterproof rubber pad 6. The upper shell 1 is transparent, the self-powered unit 5 is fixedly mounted to a corresponding position of the bottom of the lower shell 7 by screws, the LED strip board 2 and the core control circuit board 3 are connected together by nut columns, and the power storage module 4 is glued to the back of the core control circuit board 3. The combination of the LED strip board 2, the core control circuit board 3, and the power storage module 4 is mounted to a corresponding position of the top of the lower shell 7 by screws. The waterproof rubber pad 6 is glued to the top of the lower shell 7, the upper shell 1 is mounted on the waterproof rubber pad 6, and the upper shell 1 and the lower shell 7 are locked from the bottom of the lower shell 7 by screws. The wheel rotation imaging device is mounted to a corresponding position of a wheel by five screws riveted to the bottom of the lower shell 7.

The LED strip board 2 matches the shape of the wheel, may be bent a radian, and includes a plurality of LED bead arrays extending radially outward along the wheel, an interface, and a control circuit. The plurality of LED bead arrays is converged in the center of the wheel. Both the interface and the control circuit are connected to LED beads in each LED bead array by signals. As shown in FIG. 1, the LED strip board 2 includes five LED bead arrays uniformly distributed along the circumference of the wheel, and each LED bead array contains the same number of beads. The LED beads are three-color LEDs, and can display colors. The content to be displayed is a text, a static image, a dynamic image or a video.

Figure 4:
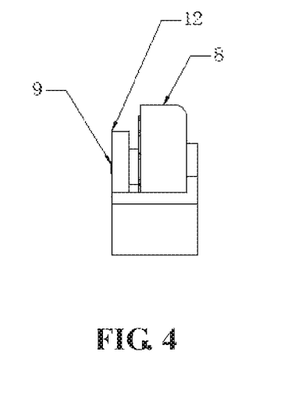
FIG. 4 is a first schematic structural diagram of a self-powered element of the wheel rotation imaging device according to the present disclosure.
Figure 5:
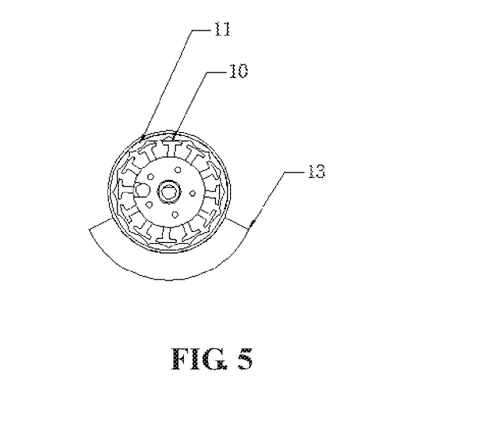
FIG. 5 is a second schematic structural diagram of a self-powered element of the wheel rotation imaging device according to the present disclosure.

The self-powered unit 5 generates power by means of rotation of the wheel. As shown in FIGS. 4-5, the self-powered unit includes a shell 8, a bearing 9, a rotor 10, a stator, a bearing seat 12, and an eccentric weight 13. The rotor 10 includes a core and a coil, the stator is a high temperature resistant magnetic pole 11, the rotor 10 is fixed to the bearing seat 12, the bearing seat 12 is fixed to a housing of the wheel rotation imaging device, the housing of the wheel rotation imaging device is fixed to the wheel, and the rotor 10 rotates synchronously with the wheel. The high temperature resistant magnetic pole 11 is disposed inside the shell 8 and is annular, the bearing 9 is fixed in the center of the inner side of the shell 8, and the eccentric weight 13 is fixedly mounted to the outer side of the shell 8. The bearing 9 passes through the centers of the bearing seat 12 and the rotor 10, and the high temperature resistant magnetic pole 11 is sleeved on the periphery of the rotor 10. The rotation of the wheel drives the rotor 10 to rotate; the eccentric weight 13, the shell 8 and the high temperature resistant magnetic pole 11 are stationary, and the rotor 10 and the high temperature resistant magnetic pole 11 move relative to each other to cut magnetic induction lines so as to generate current. The eccentric weight 13 is made of a high-density tungsten alloy. The generator rotor 10 includes a core and a coil, and the coil is made of a high-frequency copper wire, which is realized by a numerically controlled precision winding process, so the rotor is compact in structure, light and efficient. The joint surface of the core and the coil is an arc surface, so the pressing effect is good and little magnetic flux leaks. The yoke formed by curved stacking of high-quality high-conductivity magnetic cold-rolled silicon steel sheets is closer to the induction coil, and plays a role in making full use of the magnetic conductive area of the silicon steel sheets, constraining outward diffusion of magnetic flux leakage of the induction coil, improving the magnetic induction efficiency, and fixing the magnetic pole. In operation, the high temperature resistant magnetic pole 11 is connected to the generator shell 8 and the weight by means of the bearing 9 to achieve a relatively static state, the rotor 10 is partially connected to the outer shell of the entire product through the base of the bearing 9 and finally connected to a hub to move synchronously with the hub, the rotor 10 rotates and cuts the magnetic lines to generate alternating current, and the alternating current is output to a core control module for processing.

Figure 3:
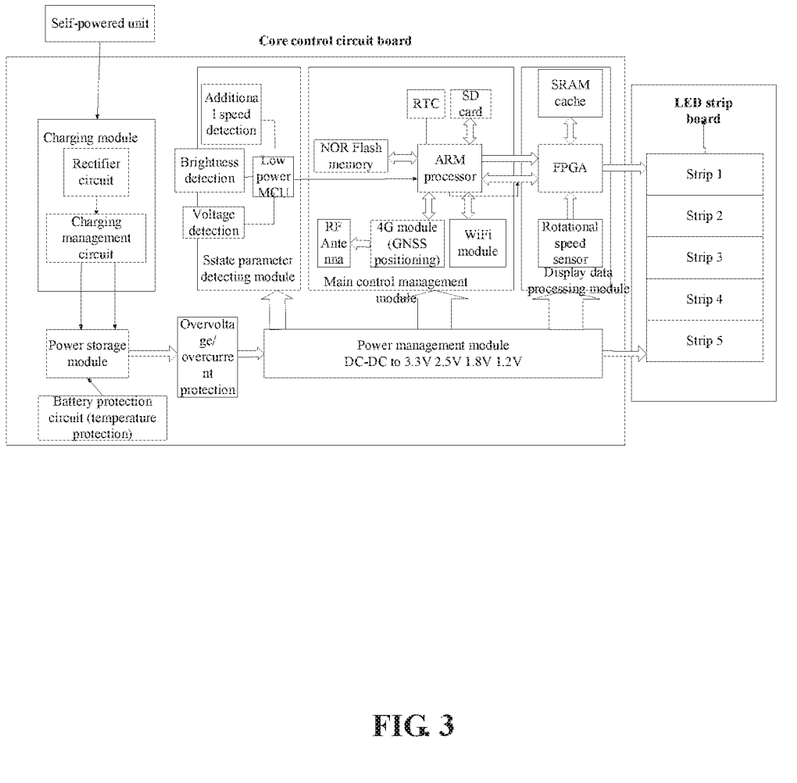
FIG. 3 is a circuit principle diagram of the wheel rotation imaging device according to the present disclosure.

As shown in FIG. 3, the core control circuit board 3 includes a charging module, a power management module, and a core control module. The charging module includes a rectifier circuit, a charging management circuit, and a battery temperature protection circuit. The battery temperature protection circuit prevents excess temperature of batteries and prevents the batteries from exploding. The self-powered unit 5 is electrically connected to the charging module, the charging module is electrically connected to the power storage module 4, and the charging module rectifies the alternating current input by the self-powered unit 5, and charges the power storage module 4 through the charging management circuit; the power storage module 4 is connected to the power management module and supplies power to the power management module, and the power management module supplies power to the core control module, the interface and the control circuit; an overvoltage and overcurrent protection circuit is further disposed between the power storage module 4 and the power management module, and the power storage module 4 is connected to the power management module through the overvoltage and overcurrent protection circuit. The power storage module 4 includes a plurality of rechargeable battery packs.

As shown in FIG. 3, the core control module is connected to the interface and the control circuit by signals, and the core control module integrates wireless modules, a positioning module, rotational speed sensors, a micro-electromechanical system (MEMS sensor) with built-in three-axis gyroscope and three-axis accelerometer, a light intensity sensor, and storage elements. The core control module includes a state parameter detecting module, a main control management module, and a display data processing module; the state parameter detecting module includes a first control module, a first rotational speed sensor, and a light intensity sensor, both the first rotational speed sensor and the light intensity sensor being connected to the first control module by signals; the main control management module includes a second control module, a 4G module with a positioning module, and a WiFi module, both the 4G module and the WiFi module being connected to the second control module by signals; the display data processing module includes a micro-electromechanical system with built-in three-axis gyroscope and three-axis accelerometer, a second rotational speed sensor, and a third control module, both the micro-electromechanical system and the second rotational speed sensor being connected to the third control module by signals; both the first control module and the third control module being connected to the second control module by signals. The storage elements include an SD card and a NOR Flash memory that are connected to the second control module by signals, and an SRAM buffer connected to the third control module by signals. The first control module is a low power MCU, the second control module is an ARM module, and the third control module is an FPGA module.

The core control module can receive content information to be displayed through the wireless modules, and convert the content information to be displayed into driving signals for driving the LED beads on the LED strip board 2 to light or extinguish in a time sequence, the core control module transmits the driving signals to the interface and the control circuit, and the interface and the control circuit drive the LED beads on the LED strip board 2 to display the content to be displayed. Specifically, the main control management module receives advertising data of video signals through the 4G module, and the video data processing portion receives the video signals of the main control management module, and drives the LED strip board to complete rotation imaging display of images. The display data processing module is implemented by FPGA programming, an FPGA receives video data of the 4G module in the main control management module, the FPGA chip realizes the image conversion froms video images in Cartesian coordinates to images in angular coordinates by running a high-speed video image data caching technology and a coordinate conversion algorithm, and after the conversion is complete, the displaying color difference is adjusted by color correction. Finally, the FPGA transmits the corrected data to the interface and the control circuit to control the LED beads on the LED strip board 2 to light.

The core control module can acquire location information, wheel speed information, wheel angular velocity information, wheel acceleration information, and light intensity information of the wheel rotation imaging device in real time. In this embodiment, the 4G module includes a positioning module, such as a GPS module, a Beidou module or a GNSS module, and can acquire the location information of the wheel rotation imaging device in real time. The rotational speed of the hub and the brightness of ambient light are detected by the sensors, and the state of the display system is adjusted accordingly, so that the display is more intelligent and the display effect is improved. The ambient light is detected by a photosensitive element, which is placed on the top of the light strips and separated from the LEDs by a light shielding plate to avoid the influence of self-illumination on the detection, and the detection of the ambient light is used to assist in adjusting the display brightness. The rotational speed is detected by a Hall element, and the angle at the time of speed change is adjusted with the aid of the gyroscope and the accelerometer in the MEMS sensor. The detection of the rotational speed is mainly used to adjust the imaging angle to ensure the directional stability of an image, and the rotational speed can also be used to assist in controlling the power management system. The power supplied to part of modules is cut off when the rotational speed is too low or too high. By detecting the acceleration and the angular velocity, the colors lightened and displayed on the LED strip board 2 at an angle under polar coordinates are determined according to the rotational acceleration and angular velocity of the wheel rotation imaging device.

Embodiment 2

Figure 6:
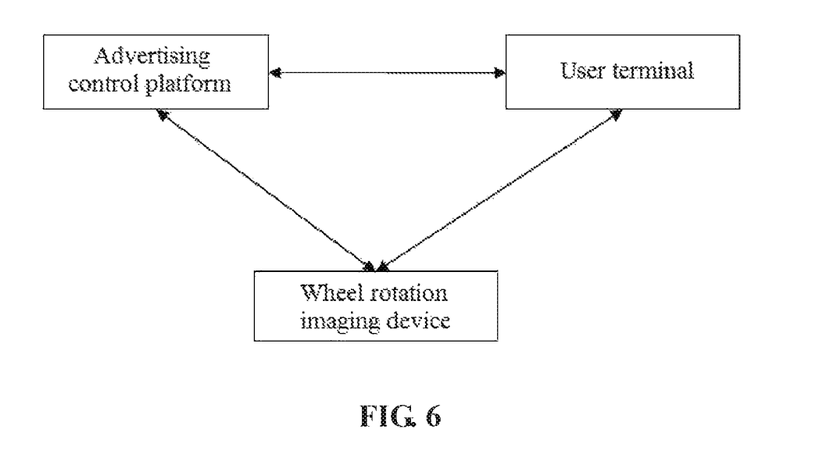
FIG. 6 is a schematic structural diagram of a wheel rotation imaging intelligent advertising system according to the present disclosure.

As shown in FIG. 6, the second embodiment provides a wheel rotation imaging intelligent advertising system, including an advertising control platform, a user terminal, and the wheel rotation imaging device described in the first embodiment. The advertising control platform can establish a wireless connection with the wheel rotation imaging device and the user terminal and data is transmitted to each other; the user terminal can establish a wireless connection with the wheel rotation imaging device and data is transmitted to each other. The advertising control platform adopts a B/S architecture, and mainly implements the functions of advertising material management, remote advertising material delivery, device location query, device state monitoring, payment management, program management, remote control, platform maintenance, etc. through a cloud platform management architecture of service-oriented SOA. The advertising control platform can establish a wireless connection with the corresponding wheel rotation imaging device according to the device number (such as the number of an SIM card), and transmit advertising data to the corresponding wheel rotation imaging device through a wireless network. The advertising control platform includes a storage module, and the storage module stores a user database. The storage module further stores device numbers of all factory devices. If the device number input by the user at the user terminal is not the stored device number, the advertising control platform can report the error to the user terminal. User's advertising materials are stored in the user database of the advertising control platform, the user terminal can establish a wireless connection with the advertising control platform, and the advertising materials can be increased by uploading or downloading on the advertising control platform, and can be packaged, edited and deleted. The advertising control platform can set user levels, and different levels of users have different rights to upload, download, and delete the advertising materials. The advertising control platform can classify users, a user tree has three levels, the first level is a super administrator, and the account of the super administrator is unique; the super administrator can create second and third levels of user accounts, and different levels of users enjoy different usage configuration rights. The advertising control platform can acquire operation information of the wheel rotation imaging device, update the operation information, and synchronize the operation information to the corresponding user database, where the operation information includes rotation imaging display content and display duration information (which may be cumulative display duration), advertising data information stored in the device, device state information (for example, the device is being displayed, the device is turned off), location information, wheel speed information, vehicle acceleration, or light intensity information. The advertising control platform can perform fee calculation and billing update according to the operation information, and synchronize the fee information and the billing state to the user database.

The user terminal may be a vehicle terminal, a smart phone or a tablet computer. The user terminal has a storage module and an APP software, the APP software may be developed based on a system such as Android or iOS, and the user terminal implements the functions of user management, material management, device management, payment management, version update, etc. based on cloud platform management. The user terminal can perform user registration and login on the advertising control platform, acquire a storage space to establish a corresponding user database, add the device number (for example, the Sim card number in the 4G module) of more than one wheel rotation imaging device that the user has the right to use to the corresponding user database, and apply for an advertisement to the advertising control platform. The user terminal can remotely access the user database, view billing rule, billing state and fee information in real time, and recharge, collect or pay the fee. This embodiment can technologically control the network payment from the aspects of payment environment, identity authentication, information transmission channel, network payment technology and the like by using mature, secure and reliable on-line payment technologies, thereby realizing a secure and reliable on-line payment environment. Meanwhile, the payment can be achieved through WeChat, Alipay, e-banking, account deposit, etc., in line with the habits of mass users. The user terminal can remotely access the user database, consult user information, information of the wheel rotation imaging device and software version information, and view the operation information and operation history information of the wheel rotation imaging device in real time. The user terminal can download a new version of user terminal APP software from the advertising control platform and update the software version; the wheel rotation imaging device can download a new version of firmware software of the wheel rotation imaging device from the advertising control platform, and upgrade the firmware.

The wheel rotation imaging device utilizes the "visual persistence" effect, performs LED display coding according to the advertising content, controls each bead of the LED strips to light, and displays the advertising content by rotation imaging, the advertising content being a text, a static image, a dynamic image or a video. The wheel rotation imaging device is mounted to a wheel, the advertising content is displayed as the wheel rotates, and the wheel rotation imaging device can complete rotation imaging display of the advertising content according to the received advertising data, as described in the first embodiment.

The embodiments of the application are described in detail above, particular examples are used herein to explain the principle and embodiments of the application, and the above description of the embodiments is only used to help understanding the methods and core concept of the application; and meanwhile, for those having ordinary skill in the art, according to the idea of the application, there will be changes in the specific implementation mode and application scope, in conclusion, the contents of the specification shall not be construed as a limitation of the application.

The invention claimed is:

1. A wheel rotation imaging device, comprising a self-powered unit, a power storage module, a core control circuit board, and an LED strip board, wherein
the LED strip board matches the shape of a wheel, and comprises a plurality of LED bead arrays extending radially outward along the wheel, an interface, and a control circuit, the interface and the control circuit being connected to LED beads in each LED bead array by signals, and each LED bead array containing the same number of beads;
the self-powered unit generates power by means of rotation of the wheel;
the core control circuit board comprises a charging module, a power management module, and a core control module; the charging module comprises a rectifier circuit and a charging management circuit; the self-powered unit is electrically connected to the charging module, the charging module is electrically connected to the power storage module, and the charging module rectifies alternating current input by the self-powered unit, and charges the power storage module through the charging management circuit; the power storage module is connected to the power management module and supplies power to the power management module, and the power management module supplies power to the core control module, the interface and the control circuit;
the core control module is connected to the interface and the control circuit by signals, and the core control module integrates wireless modules, a positioning module, rotational speed sensors, a micro-electromechanical system with built-in three-axis gyroscope and three-axis accelerometer, a light intensity sensor, and storage elements; the core control module is able to receive content information to be displayed through the wireless modules, and convert the content information to be displayed into driving signals for driving the LED beads on the LED strip board to light or extinguish in a time sequence, the core control module transmits the driving signals to the interface and the control circuit, and the interface and the control circuit drive the LED beads on the LED strip board to display the content to be displayed; and the core control module is able to acquire location information, wheel speed information, wheel angular velocity information, wheel acceleration information, and light intensity information of the wheel rotation imaging device in real time.

2. The wheel rotation imaging device according to claim 1, wherein the core control module comprises a state parameter detecting module, a main control management module, and a display data processing module;
the state parameter detecting module comprises a first control module, a first rotational speed sensor, and a light intensity sensor, both the first rotational speed sensor and the light intensity sensor being connected to the first control module by signals;
the main control management module comprises a second control module, a 4G module with a positioning module, and a WiFi module, both the 4G module and the WiFi module being connected to the second control module by signals;
the display data processing module comprises a micro-electromechanical system with built-in three-axis gyroscope and three-axis accelerometer, a second rotational speed sensor, and a third control module, both the micro-electromechanical system and the second rotational speed sensor being connected to the third control module by signals;
the first control module and the third control module are both connected to the second control module by signals.

3. The wheel rotation imaging apparatus according to claim 1, wherein the charging module further comprises a battery temperature protection circuit for preventing excess temperature of batteries.

4. The wheel rotation imaging apparatus according to claim 1, wherein an overvoltage and overcurrent protection circuit is further disposed between the power storage module and the power management module, and the power storage module is connected to the power management module through the overvoltage and overcurrent protection circuit.

5. The wheel rotation imaging apparatus according to claim 1, wherein the self-powered unit comprises a shell, a bearing, a rotor, a stator, a bearing seat, and an eccentric weight; the rotor comprises a core and a coil, the rotor is fixed to the bearing seat, the bearing seat is fixed to a housing of the wheel rotation imaging device, the housing of the wheel rotation imaging device is fixed to the wheel, and the rotor rotates synchronously with the wheel; the stator is disposed inside the shell and is annular, the bearing is fixed in the center of the inner side of the shell, and the eccentric weight is fixedly mounted to the outer side of the shell; the bearing passes through the centers of the bearing seat and the rotor, and the stator is sleeved on the periphery of the rotor; the rotation of the wheel drives the rotor to rotate, the eccentric weight, the shell and the stator are stationary, and the rotor and the stator move relative to each other to cut magnetic induction lines so as to generate current.

6. A wheel rotation imaging intelligent advertising system, comprising an advertising control platform, a user terminal, wherein the wheel rotation imaging intelligent advertising system further comprises the wheel rotation imaging device according to claim 1, the advertising control platform being able to establish a wireless connection with the wheel rotation imaging device and the user terminal and data being transmitted to each other; the user terminal being able to establish a wireless connection with the wheel rotation imaging device and data being transmitted to each other;
the advertising control platform comprises a storage module, and the storage module stores a user database;
the user terminal is able to perform user registration and login on the advertising control platform, acquire a storage space to establish a corresponding user database, add the device number of more than one wheel rotation imaging device to the corresponding user database, and apply for an advertisement to the advertising control platform;

the advertising control platform is able to establish a wireless connection with the corresponding wheel rotation imaging device according to the device number, and transmit advertising data to the corresponding wheel rotation imaging device through a wireless network;

the wheel rotation imaging device is mounted to a wheel, the advertising content is displayed as the wheel rotates, and the wheel rotation imaging device is able to complete rotation imaging display of the advertising content according to the received advertising data.

7. The wheel rotation imaging intelligent advertising system according to claim 6, wherein user's advertising materials are stored in the user database of the advertising control platform, the user terminal is able to establish a wireless connection with the advertising control platform, and the advertising materials are able to be increased by uploading or downloading on the advertising control platform, and are able to be packaged, edited and deleted.

8. The wheel rotation imaging intelligent advertising system according to claim 7, wherein the advertising control platform is able to set user levels, and different levels of users have different rights to upload, download, and delete the advertising materials.

9. The wheel rotation imaging intelligent advertising system according to claim 6, wherein the advertising control platform is able to acquire operation information of the wheel rotation imaging device, update the operation information, and synchronize the operation information to the corresponding user database, the operation information comprising rotation imaging display content and display duration information, stored advertising data information, device state information, location information, wheel speed information, or light intensity information.

10. The wheel rotation imaging intelligent advertising system according to claim 9, wherein the advertising control platform is able to perform fee calculation and billing update according to the operation information, and synchronize the fee information and the billing state to the user database; and the user terminal is able to remotely access the user database, view billing rule, billing state and fee information in real time, and recharge, collect or pay the fee.

11. The wheel rotation imaging intelligent advertising system according to claim 9, wherein the user terminal is able to remotely access the user database, consult user information, information of the wheel rotation imaging device and software version information, and view the operation information and operation history information of the wheel rotation imaging device in real time.

12. The wheel rotation imaging intelligent advertising system according to claim 10, wherein the user terminal is able to remotely access the user database, consult user information, information of the wheel rotation imaging device and software version information, and view the operation information and operation history information of the wheel rotation imaging device in real time.

\* \* \* \* \*